United States Patent

Müller et al.

[11] Patent Number: 5,976,402
[45] Date of Patent: Nov. 2, 1999

[54] P-DINITROSOBENZENE

[75] Inventors: Burkhard Müller, Düsseldorf; Brigitte Calaminus, Hilden; Wolf-Dieter Beiersdorf, Düsseldorf; Werner Gruber, Korschenbroich; Hans-Josef Hoffmann, Düsseldorf; Rainer Wefringhaus, Erkrath; Peter Kuhm, Hilden; Norbert Hübner, Düsseldorf; Christian Block, Köln, all of Germany

[73] Assignee: Henkel Kommanditgesellschaft auf Aktien (KGaA), Duesseldorf, Germany

[21] Appl. No.: 08/522,274

[22] PCT Filed: Feb. 28, 1994

[86] PCT No.: PCT/EP94/00579

§ 371 Date: Oct. 3, 1995

§ 102(e) Date: Oct. 3, 1995

[87] PCT Pub. No.: WO94/20570

PCT Pub. Date: Sep. 15, 1994

[30] Foreign Application Priority Data

Mar. 9, 1993 [DE] Germany ............... 43 07 221

[51] Int. Cl.⁶ ..................................... C09K 3/00
[52] U.S. Cl. ................ 252/182.23; 252/182.12; 252/182.13; 428/403; 428/404; 428/406
[58] Field of Search .......... 252/182.12, 182.13, 252/182.23; 428/403, 404, 406

[56] References Cited

U.S. PATENT DOCUMENTS 2,419,976  5/1947  Trepagnier et al. ............... 260/647
5,036,122  7/1991  Averback et al. ................ 524/259

FOREIGN PATENT DOCUMENTS 2228544  3/1974  Germany.

*Primary Examiner*—Edward J. Cain
*Attorney, Agent, or Firm*—Wayne C. Jaeschke; Daniel S. Ortiz; John D. Wood

[57] ABSTRACT

Compositions containing p-dinitrosobenzene deposited onto a support of a chemically inert material which is solid at room temperature are provided. The composition is preferably formed by depositing p-dinitrosobenzene from a solution or by sublimation or in the course of its synthesis in the presence of one or more supports. Hydrophilic or hydrophobic silica, hydrophobicized zeolites, carbon blacks and layer silicates are examples of supports. The composition is useful in the production of adhesives, more particularly for bonding elastomers, e.g. in the polymerization or crosslinking of elastomers, and even more particularly in the bonding of rubber to metal.

30 Claims, 2 Drawing Sheets

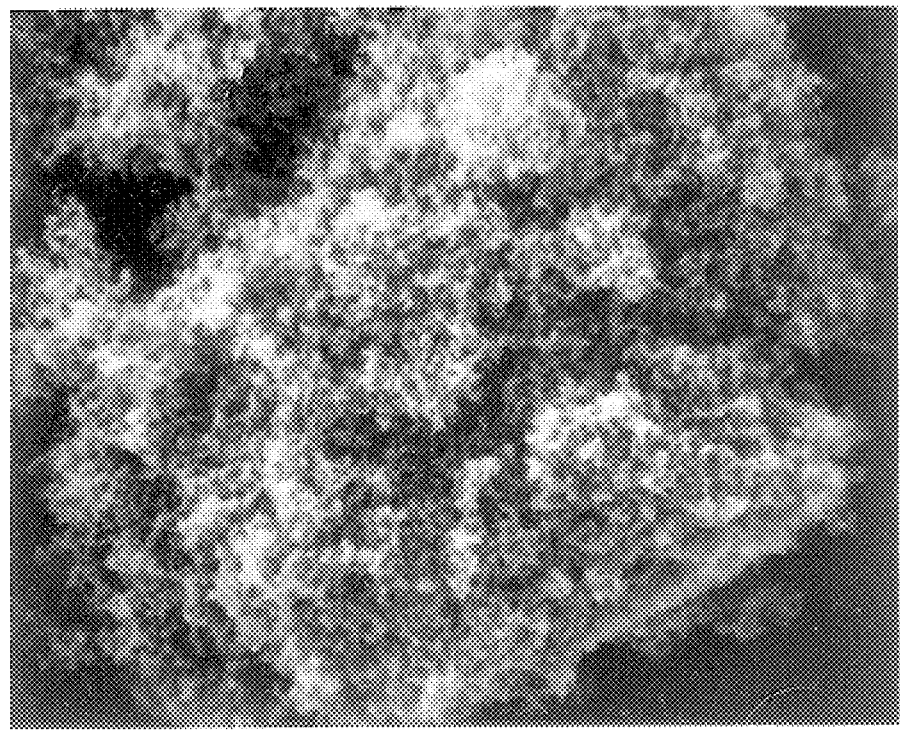
FIG. 1  1 μm
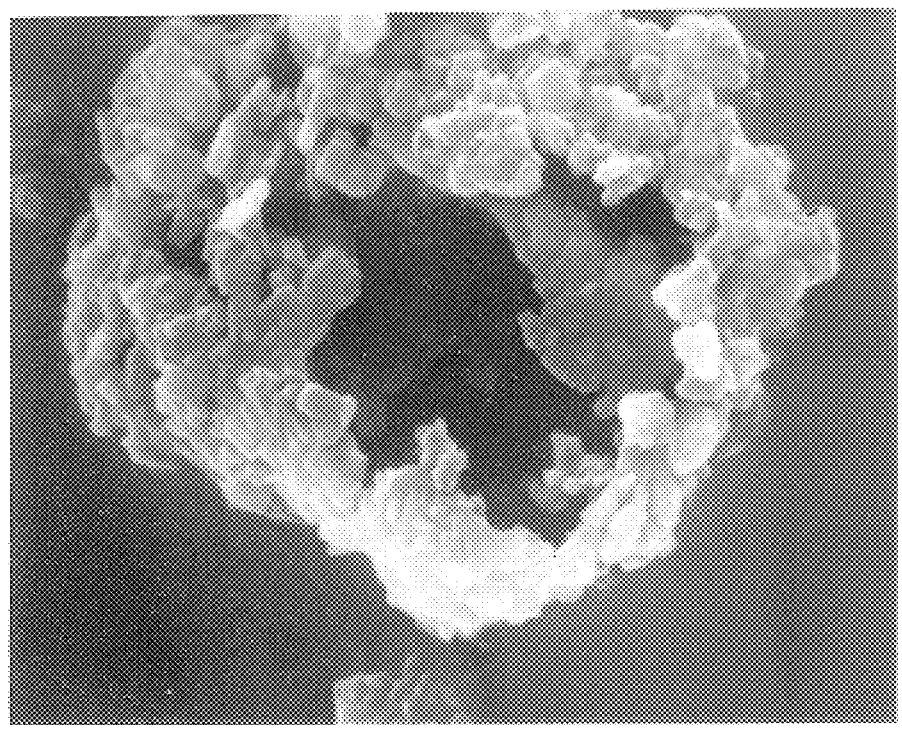
FIG. 2  1 μm

P-DINITROSOBENZENE

BACKGROUND OF THE INVENTION

1. Field of the Invention

This invention relates to p-dinitrosobenzene on a support, to its production and to its use as a crosslinking aid.

2. Discussion of Related Art p-Dinitrosobenzene (DNB) is a finely crystalline, dark green product which is only sparingly soluble in alcohol, xylene and water. It is supplied in the form of an approximately 25 to 50% suspension in aromatic hydrocarbons. It is used as a highly active crosslinking agent, for example in adhesives, and as a sulfur-free vulcanizing agent for synthetic and natural rubber mixtures.

Thus, DE 22 28 544 describes a binder for the production of composites by vulcanization of rubber mixtures onto metals or other stable substrates. In addition to chlorosulfonated polyethylene, chlorinated rubber, polyisocyanates and a phenolic resin, this binder also contains dinitrosobenzene in the form of a suspension in solvents.

In DE 34 00 852, DNB is described as a constituent of a moisture-curing one-component polyurethane lacquer for coating elastomers. The DNB may be used both in the form of a pure chemical substance and in the form of a 30 to 40% suspension in quantities of 0.5 to 4% by weight, based on the solventless lacquer resins.

In DE 34 00 340, DNB is described as a constituent of an adhesive for the electrostatic flocking of flexible substrates. The adhesive additionally consists of an isocyanate-terminated polyurethane prepolymer, a reaction product of polyfunctional epoxides with aromatic diisocyanates and solvents and/or dispersants. The DNB is present in quantities of 0.5 to 4% by weight, based on the solventless adhesive. It may be used both as a pure substance or as a solution or dispersion in nonsolvents. Although reference is made to a 30 to 40% by weight solution of dinitrosobenzene, for example in xylene, toluene or methyl isobutyl ketone, the dinitrosobenzene cannot be p-dinitrosobenzene because p-dinitrosobenzene only forms an approximately 2% solution in boiling xylene (see P. Ruggli and G. Bartusch in Helvetia Chimia Acta 27 (1944), page 1371 et seq.).

DE 30 35 181 describes a bonding agent based on an aqueous dispersion of an organic polymeric film former for bonding rubber to metallic or non-metallic substrates under vulcanization conditions, the dispersion containing adhesion-promoting additives, an aromatic polynitroso compound and optionally fillers. The aromatic polynitroso compound is inter alia dinitrosobenzene which is added as a 40% aqueous dispersion consisting of 5 parts of dinitrosobenzene, 1 part of carbon black and 9 parts of water in quantities of 10 to 100 parts by weight, based on the copolymer.

DE 12 72 301 describes the thermal stabilization of aromatic nitroso compounds by an addition of 20 to 200% by weight, based on the dinitroso compound, of a decomposable metal or ammonium salt or by addition of 0 to 234% by weight, based on the dinitroso compound, of a silicate-containing water adsorbent. $MgSO_4.7H_2O$ is preferably used as the salt. Calcium silicate, clay and other inert fillers and carriers are mentioned as adsorbents.

Although the known use of DNB in binders leads to permanent bonds, more particularly between synthetic or natural rubber and metals, and although the bonds thus obtained are also distinguished by high permanent strength and by high resistance to aggressive media, it is also attended by disadvantages. Unreacted DNB can give rise to continuing vulcanization in the event of subsequent heat treatment, resulting in unwanted embrittlement of the bond. DNB is also relatively expensive.

SUMMARY OF THE INVENTION

Accordingly, the problem addressed by the present invention was to use DNB in smaller quantities without at the same time adversely affecting the mechanical properties of the binder, more particularly its strength and stability.

The solution to this problem as provided by the invention is defined in the claims. It is essentially characterized in that p-dinitrosobenzene is applied to a support. It thus assumes a highly active form. Accordingly, the manner in which the DNB is applied to the support is crucial to the effectiveness of the composition according to the invention. Simple grinding with carbon black, for example, does not produce any activation. Instead, the DNB has to be deposited onto a support. By "deposition" is meant the application of the DNB from a molecularly disperse phase to the support in fine-particle solid form, for example in the course of sublimation or precipitation or recrystallization from a solution. "Deposition" also includes the application of the DNB in situ in the course of its synthesis from p-benzoquinone dioxime (QDO) with various oxidizing agents in the simultaneous presence of the support.

DETAILED DESCRIPTION OF THE INVENTION

The DNB is preferably deposited onto a support from a solution by temperature reduction. However, the DNB may also be deposited by evaporation of the solvent from a saturated solution or by addition of a precipitant.

Good solvents for DNB were hitherto unknown. It has now been found that DNB is soluble in various amides in adequate concentrations of 1 to 5 g/l at temperatures of 80 to 100° C. Dimethyl formamide, dimethyl acetamide, dimethyl propionamide and N-methyl-2-pyrrolidone are mentioned in particular. It is possible above all at elevated temperature to dissolve DNB in such amides so that it may subsequently be applied to the support on cooling, enabling the composition according to the invention to be economically produced.

DNB may be applied from solutions by several methods:

The DNB is dissolved hot, any undissolved residue is filtered off and, finally, the support is added to the filtrate. The DNB then partly precipitates on cooling and is completely or partly deposited onto the support.

A clear solution is again initially prepared. After addition of the support, the solvent is removed by evaporation, leaving behind the mixture according to the invention of DNB and support.

Any undissolved residues accumulating need not be filtered off. This leads to an increased yield of the composition according to the invention for slightly reduced activity.

The dissolved DNB is preferably deposited onto the support over a period of 0.5 to 15 hours.

Besides application from a solution, application in situ in the synthesis of DNB in the presence of a support is of particular importance. According to the invention, 6 synthesis methods above all may be used: oxidation of QDO with $FeCl_3$, with $H_2O_1/HCl$, with $K_3[Fe(CN)_6]$, with NaOCl/NaOH, with $NO/NaOCH_3$ or NaOCl and with chlorine.

These syntheses are known, see for example Y. S. Khishchenko et al.: J. Appl. Chem. USSR, 42, 2245 (1969), O. A.

Ermakov and Y. F. Komkova: J. Org. Chem USSR, 20, 2053 (1984), O. A. Ermakov and Y. F. Konkova: J. Gen. Chem. USSR, 57, 1423 (1987), R. Nietski and F. Kehrmann: Chem. Ber. 20, 613 (1887), U.S. Pat. No. 2,419,976 (6.5.1947) and Methodicum Chimicum Vol. 6, page 29 (1974).

In principle, the production of DNB from QDO in the presence of support materials differs in the following respects:

(a) variation of the support material,
(b) variation of the oxidizing agent or combinations thereof,
(c) variation of the reaction time and
(d) variation of the pH value in the oxidative reaction (acidic: $FeCl_3$, $H_2O_2$; alkaline: any hydrohalic acids and salts thereof). The pH value may differ considerably from the pH values mentioned in the Examples, products with modified properties being obtained.

A "support" is understood to be a chemically inert material which serves as a substrate and framework for the active substance DNB. In principle, suitable supports are any materials which are solid at room temperature and which are insoluble in the solvents used in the production of the DNB/support composition according to the invention and in the binders. In addition, the support used should not have any adverse influence on the effect of the binder in the quantities in which it is used. Highly porous materials have proved to be particularly suitable supports.

Highly porous materials are understood to be materials which have an inner surface, i.e. are either present in finely divided amorphous form or comprise voids determined in advance by the crystal lattice. In general, inner surfaces have to be determined by measurement of the BET surface. In the case according to the invention, BET surfaces of more than 10 $m^2/g$ are advantageous.

Broadly speaking, suitable support materials are:

Crystalline and amorphous silicates, alumosilicates, borosilicates, aluminium (hydr)oxides.

Very fine-particle, amorphous and crystalline metal oxides and hydroxides (individually or in admixture).

Dried water-soluble and water-insoluble salts in which a microporous particle structure has been established by suitable process management during the drying process.

Polymeric organic solids with BET surfaces of more than 1 $m^2/g$.

Carbon blacks, i.e. mixtures consisting essentially of carbon but otherwise unidentified in relation to their chemical composition.

Particularly suitable carbon blacks are gas blacks and pigment blacks which are characterized by a BET surface of more than 20 $m^2/g$ and preferably more than 60 $m^2/g$. The types "Spezialschwarz 4" and "Farbruß S 170", both products of DEGUSSA AG, are mentioned as examples. These carbon blacks have incineration residues of less than 0.1% and particle sizes below 50 nm (information source: DEGUSSA AG, company publication). Their density is between 1.8 and 1.9 $g/cm^3$. If the particle sizes of the carbon blacks are measured by light diffraction or light scattering methods in xylene or toluene (instrument: Sympatec Helos manufactured by the Sympatec company), mean particle sizes below 100 $\mu$m are measured without ultrasonic dispersion. After ultrasonication of the dispersion for 1 minute, the mean particle size should have fallen to values below 40 $\mu$m.

Other specific examples are hydrophilic and hydrophobic silica and also hydrophobicized zeolites. Layer silicates such as, for example, hectorite, saponite and magadiite are also suitable.

The particle size of the composition according to the invention is generally below 100 $\mu$m and more particularly below 40 $\mu$m. The size of the individual DNB crystals, which have grown onto the support materials, should be measured from scanning electron micrographs. The individual crystal size should be no larger than 10 $\mu$m and no smaller than 0.1 $\mu$m. The optimum may vary from application to application, but is of the order of 0.3 $\mu$m to 3 $\mu$m. However, the values mentioned apply solely to individual crystals. The individual crystals may have twinned or coalesced into larger aggregates. The size of the aggregates is only of minor importance when the visible individual crystallite size lies within the required tolerances of 0.3 to 3 $\mu$m.

BRIEF DESCRIPTION OF THE DRAWINGS

FIGS. 1 to 4 are scanning electron micrographs of 1) a pigment black (as support material; Spezialschwarz 4),
2) pure DNB (prepared by method 2 A),
3) DNB on a support material by method 2 F) and
4) pure DNB (as FIG. 2) mechanically mixed with the support material (as FIG. 1).

Figure 3:
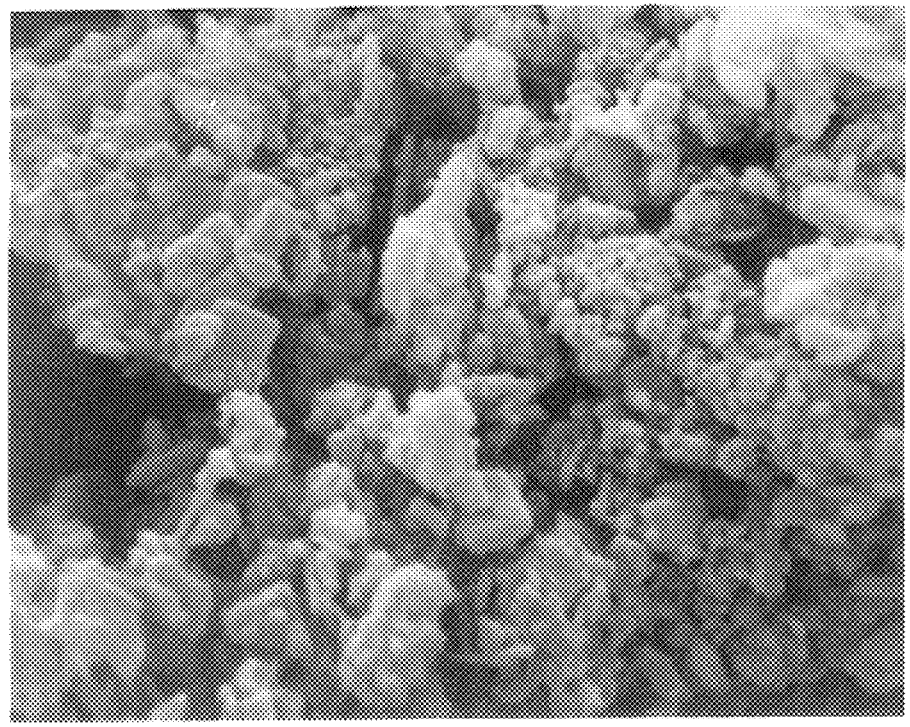
Figure 4:
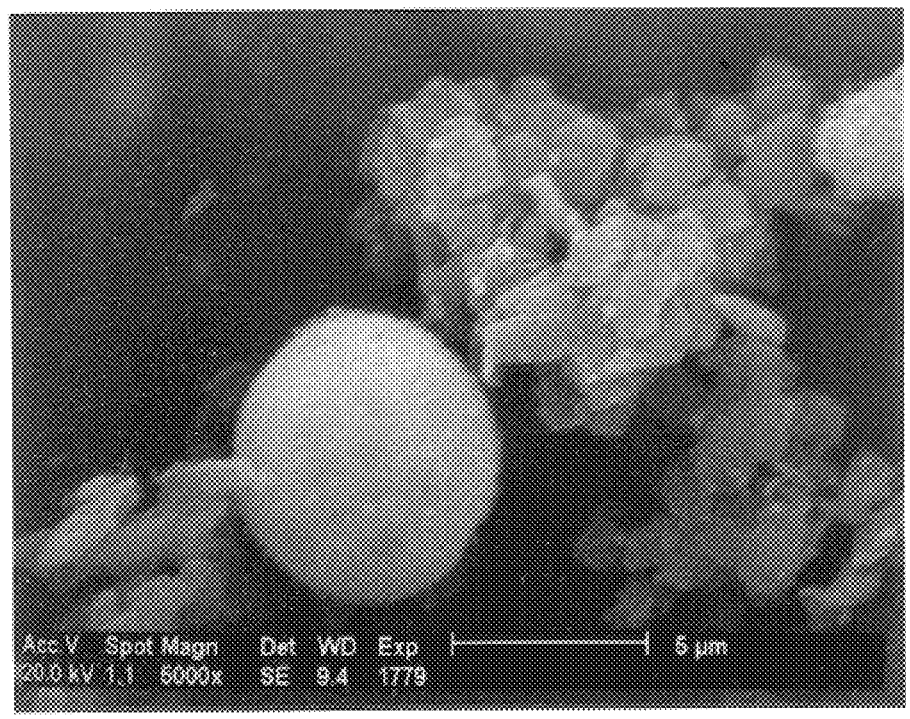

The activity of DNB is also determined by the quantity in which it is present on the support. It has been found that the relative activity (=activity per unit weight of pure DNB) of DNB applied to a large quantity of support material is higher than when it is present, for example, in excess, based on the support. However, since the absolute activity, i.e. the activity based on the final mixture, decreases with decreasing DNB content, a high degree of dilution leads necessarily to relatively high percentage contents of support in the binder. However, this often unfavorable so that a compromise has to be found. It is generally between 15 and 90 g of DNB/100 g of the DNB/support composition and, more particularly, between 40 and 80 and preferably between 50 and 75 g/100 g of composition.

At least 10% by weight, preferably at least 50% by weight and more preferably at least 80% by weight of the DNB is deposited onto the support.

Other suitable oxidizing agents are salts of the oxo acids of the halogens chlorine, bromine and iodine. The sodium and potassium salts of chlorous acid, hypochlorous acid, chloric acid and perchloric acid are particularly preferred. These salts may be used both individually and in combination with one another or in combination with another oxidizing agent, such as $FeCl_3$ or $H_2O_2$, for the oxidation of QDO to DNB in the presence of a suitable support material. DNB is preferably produced with $FeCl_3$ and hydrogen peroxide or in combination with salts of the oxo acids of the halogens.

The reaction temperature is important not only to the reaction time, but also to the specific activity of the DNB. Thus, the activity of the DNB decreases with increasing reaction temperature. Accordingly, DNB produced at 90° C. should best be used when importance is attributed to its uniform and relatively slow reaction. By contrast, a DNB produced at 40° C. should be used when importance is attributed to a fast reaction, as for example in the case of flocking adhesives.

The reaction parameters "time" and "pH value" may also be varied within wide limits and also influence the reactivity of the DNB to a certain extent.

The DNB/support composition according to the invention shows increased vulcanization activity in relation to conventional DNB dispersions and enables the DNB to be used in a lower concentration. By virtue of this advantage, the composition according to the invention is suitable for use above all in the bonding of rubber to metals, more particularly under vulcanization conditions. The term "rubber" is understood to encompass vulcanized natural or synthetic rubbers. Vulcanization is normally carried out at elevated temperatures, for example at temperatures of 100 to 200° C.

However, the composition according to the invention is also quite generally suitable as a constituent of a binder, for example in a lubricating lacquer for elastomer parts or in an adhesive, above all for such elastomers as EPDM, NR, SBR and other elastomers, such as chlorinated rubber. Further particulars can be found in the cited prior art.

The concentration of the DNB/support composition according to the invention may be several times lower than the hitherto usual concentration, preferably amounting to between 3 and 30 g DNB per 100 g solids. The claimed adhesives are produced in known manner using the DNB/support composition according to the invention instead of the DNB dispersion otherwise typically used. The percentage content of the support is taken into account when adding fillers, i.e. correspondingly less filler is added.

The invention is illustrated by the following Examples:

I Production of the DNB/Support Composition

1) Application of DNB to a support from a solution 100 ml of dimethyl acetamide (DMA) or N-methyl-2-pyrrolidone (NMP) are added to 3 g of an approximately 45% suspension of DNB (Lord Corp., USA) in xylene, after which the suspension is heated to 100 to 120° C. and left at that temperature for 5 minutes. After the insoluble residue has been filtered off, 0.25 to 3.9 g of support are added to the hot filtrate. The suspension is stirred for 2 h with no further heating and is subsequently filtered. After washing with ethanol, the residue is dried at 50° C. in a vacuum of 50 to 200 mbar. The yield comprises 1.05 to 4.75 g of a DNB/support mixture containing 17 to 75% by weight of DNB. DNB/support mixtures B 1 to B 7 were produced by this method. The yields and compositions are shown in Table 1.

Mixture B 8 was also produced by the same general method except that the insoluble residue was not filtered off. The yield and composition are again shown in Table 1.

2A) Production of DNB from QDO/carbon black/$H_2O_2$/HCl mixtures 41.4 g of p-benzoquinone dioxime (QDO) were suspended in 200 ml of water. The suspension obtained was then heated to 50° C. and 25.6 g of carbon black (Spezialschwarz 4) were added in portions. The solution underwent a distinct increase in viscosity. 48 g of an $H_2O_2$ solution (approximately 30%) were then added dropwise. After the addition, the suspension was stirred for 4 h at 50° C., filtered while still warm, washed neutral with water (pH 5 to 6) and then rewashed with acetone. The black residue obtained was dried at 40° C. (50 to 200 mbar). The yield amounted to 63 g of a DNB/carbon black mixture containing 60% by weight of DNB. This corresponded to a theoretical conversion of 92% (based on DNB).

2B) Production of DNB from QDO/carbon black/$FeCl_3$ mixtures 41.4 g of QDO and 1,000 ml of water were introduced with stirring (80° C.) in the form of a suspension to which 14 g of carbon black (N 326) were then added. 243 g of $FeCl_3$:6 $H_2O$ were dissolved in 250 ml of water and the resulting solution was added warm to the QDO/water suspension over a period of 5 minutes with stirring. The green-brown suspension was then stirred for another 5 minutes at 80° C. The precipitate obtained was filtered off under suction while still hot, washed neutral with water (60° C.) and then rewashed with acetone. The filter residue was then dried at 50° C. (50 to 200 mbar). The yield of DNB was 75%.

2C) Production of DNB from QDO/carbon black/NaOCl/NaOH mixtures 10 g of NaOCl solution (25%) and 40 g of water were introduced with stirring at 0 to −5° C. A suspension (0 to −5° C.) of 5.1 g of QDO, 2.91 g of NaOH and 0.5 g of Aerosil (R 972) in 15 g of water was added with cooling to the sodium hypochlorite solution. After the addition, the mixture was stirred for 10 minutes (0 to −5° C.) and then filtered under suction. A 70% DNB/30% carbon black mixture was obtained.

2D) Production of DNB from QDO/silica/$K_3[Fe(CN)_6]$ mixtures 3 g of QDO were dissolved in 30 ml of 0.1 N NaOH solution and filtered. During filtration, the solution was cooled to −5° C. After filtration, 0.7 g of HDK-T40 was added as support. 14.25 g of potassium hexacyanoferrate (III) were dissolved in 38 ml of water and added dropwise so slowly that the temperature of the cooled reaction mixture did not exceed 0° C. The mixture was then stirred for 5 minutes. The precipitate was removed by centrifugation, washed with water and recentrifuged. It was then resuspended in water, filtered and finally washed with acetone. The precipitate filtered off was dried under a pressure of 50 to 200 mbar. The product obtained had the following composition: 76% DNB and 24% support. This corresponds to a yield, based on DNB, of 75.6%.

2E) Production of DNB from QDO/carbon black/$FeCl_3$/$H_2O_2$ mixtures 4.14 g of QDO were introduced into 50 ml of water with stirring at 80° C. to form a suspension. After the addition of 1.62 g of carbon black (Spezialschwarz 4), a solution of 8.1 g of $FeCl_3.6H_2O$ in 10 ml of water heated to 60° C. was introduced. The resulting suspension was then stirred for 5 minutes at 80° C. and cooled for 5 minutes to 60° C. 6.66 g of a 30% aqueous solution of $H_2O_2$ were then added dropwise over a period of 10 minutes, the reaction temperature being kept at 60° C. by addition of ice. The reaction mixture was worked up in the same way as in Example 2B. The product filtered off and dried contains 70% DNB and 30% carbon black for a yield of 5.4 g (corresponding to a yield of DNB of 93%).

2F) Production of DNB from QDO/carbon black/$FeCl_3$ mixtures

The procedure was as in Example 2B using Spezialschwarz 4 instead of N 326 as the carbon black. Substantially the same results were obtained.

II Production of the Binders

The components listed in Table 2a (except for c) and 2b are introduced into a disperser and ground for 45 minutes at room temperature to a particle size of <40 μm. The dispersion is then homogenized for 2h with addition of c (dissolved in part of the xylene).

For comparison with Examples I to IV and XI to XIV according to the invention, binders with the same composition were produced in the same way, except that the DNB was added in the form of a suspension (Examples V to VIII and XV).

III Production and Testing of Test Specimens

Adhesion was tested using peel test specimens according to ASTM-D 429 B. To produce the test specimens, plates of cold-rolled steel were degreased with 1,1,1-trichloroethane vapor, blasted with chilled iron shot and retreated with 1,1,1-trichloroethane vapor. The plates were then coated with approximately 10 μm (dry layer thickness) of a primer based on phenolic resin and with approximately 20 μm of the binders described in Table 2. After drying at room temperature, the plates were press-vulcanized onto the rubber mixtures under a pressure of approximately 50 MPa to form a peel test specimen according to ASTM D 429 B. After the test specimens had been stored for 24 hours at room temperature, the rubber was peeled off, the peel strength and fracture pattern being determined in accordance with ASTM D 429, method B (DIN 53531, Part 1).

The fracture pattern was evaluated as follows: the figure expresses the percentage of elastomer failure in %, failure in the elastomer being identified as R (rubber), failure between elastomer and binder as RC (rubber-cement), failure between primer and binder as CP (cement-primer) and separation from the metal as M (metal).

Another informative test is the so-called "preheat resistance". In this test, binder-coated metal plates were preheated at the vulcanization temperature before the rubber mixture was added and vulcanized. The longer the preheating time (in minutes) required to achieve 100% elastomer failure, the better the preheat resistance and hence the binder.

In the boiling water test (BWT), the samples were stored for 2 h in water at 95 to 98° C. while a load of 2 kg/2.54 cm was applied to the bond.

Results

Both in the peel test and in the boiling water test, the adhesive strength of the test specimens produced in accordance with the invention was so high in every case that failure in the rubber occurred in the subsequent peel strength test. The 100% failure in the rubber is a reflection of satisfactory adhesion and resistance, even with only 0.35% by weight of DNB (binder IV).

Comparison of binders I, II and III according to the invention with binder VI according to the prior art shows that the concentration of DNB when introduced in accordance with the invention can be reduced to between one third and one half by comparison with the use of known DNB suspensions. The known binder must contain 25% of DNB, based on the solids content, to obtain an equally good effect (see Example V).

Comparison of Example IV according to the invention with Examples VII and VIII corresponding to the prior art produces a similar result.

Similar results are also obtained with DNB/support compositions produced in situ (see Tables 2b and 3b).

Accordingly, the activity of the compositions according to the invention is several times higher than that of the known compositions.

TABLE 1

Composition of the p-dinitrosobenzene compositions according to the invention produced from solutions

| No. | Solvent | Yield g | DNB content % by weight | Trade name | Support Manufacturer | Chemical nature |
|---|---|---|---|---|---|---|
| B 1 | NMP | 4.7 | 17 | FK 320 | Degussa | Precipitated silica |
| B 2 | NMP | 2.25 | 35 | Zeolite S115 | Union Carbide | Hydrophobicized zeolite |
| B 3 | NMP | 3.2 | 25 | HDK T40 | Wacker | Hydrophilic silica |
| B 4 | DMA | 1.05 | 75 | HDK T40 | Wacker | Hydrophilic silica |
| B 5 | DMA | 1.05 | 75 | Aerosil R 972 | Degussa | Hydrophobicized silica |
| B 6 | DMA | 1.05 | 75 | Corax N 326 | Degussa | Carbon black |
| B 7 | DMA | 1.32 | 60 | Corax N 326 | Degussa | Carbon black |
| B 8[1)] | DMA | 2.05 | 60 | Spezialschwarz 4 | Degussa | Carbon black |

[1)]With insoluble residue

TABLE 2a

Composition of the binders (in % by weight, based on the composition as a whole)

| | Binder | | | | | | | | |
|---|---|---|---|---|---|---|---|---|---|
| | Invention | | | | | Comparison | | | |
| Component | I | II | III | IIIa | IV | V | VI | VII | VIII |
| a) Chlorinated rubber | 2.1 | 1.8 | 1.8 | 1.8 | 14.6 | 1.75 | 1.8 | 14.6 | 14.6 |
| b) Post-halogenated polymer | 0 | 0 | 0 | — | 6.2 | 0 | 0 | 6.2 | 6.2 |
| c) Chlorosulfonated polyethylene | 6.1 | 5.2 | 5.2 | 5.2 | 0 | 5.2 | 5.2 | 0 | 0 |
| d) Dinitrosobenzene[1)] | 2.0 | 2.0 | 2.0 | 2 | 0.35 | 6.0 | 2.0 | 2.1 | 0.35 |
| of Example | B8 | B7 | B4 | B5 | B1 | | | | |
| e) Bismaleic imide | 3.2 | 2.75 | 2.75 | 2.75 | 0 | 2.75 | 2.75 | 0 | 0 |
| f) Lead phosphite | 6.9 | 6.0 | 6.0 | 6 | 1.0 | 6.0 | 6.0 | 1.0 | 1.0 |
| g) Carbon black | (1.25) | (1.25) | 1.25 | 1.25 | 2.1 | 1.25 | 1.25 | 2.1 | 2.1 |
| h) Silica | 1.2 | 1.0 | (0.7) + 0.3* | (0.7) + 0.3* | (1.73) | 1.0 | 1.0 | 0 | 0 |
| i) Xylene | 77.25 | 80.0 | 80.0 | 80.0 | 74.2 | 76.0 | 80.0 | 74.0 | 75.75 |

TABLE 2b

Composition of binders XI to XV
(in % by weight, based on the composition as a whole)

| Component | XI | XII Invention | XIII | XIV | XV Comparison |
|---|---|---|---|---|---|
| a) Chlorinated rubber | 2.1 | 2.1 | 2.1 | 2.1 | 1.80 |
| c) Chlorosulfonated polyethylene | 6.1 | 6.1 | 6.1 | 6.1 | 5.20 |
| d) DNB | 3.0 | 3.0 | 3.0 | 3.0 | 6.0 |
| of Example No. | 2A | 2F | 2C | 2D | |
| e) Bismaleic imide | 3.20 | 3.20 | 3.20 | 3.20 | 2.75 |
| f) Lead phosphite | 6.90 | 6.90 | 6.90 | 6.90 | 6.00 |
| g) Carbon black | 1.25 | 1.25 | 1.25 | 1.25 | 1.25 |
| h) Silica | 1.20 | 1.20 | 1.20 | 1.20 | 1.00 |
| j) Xylene | 76.25 | 76.25 | 76.25 | 76.25 | 76.0 |

Legend to Table 2
* = 0.7% silica from DNB/silica compound
0.3% silica additionally added to the formulation
[1])p-Dinitrosobenzene, formulation:
In the comparison tests as a 35% solution in xylene (Lord Corp.)
In the binders according to the invention with addition of mixtures B8, B7, B4, B5 and B1 prepared in accordance with the invention on the support materials shown in brackets

TABLE 3a

Fracture pattern of the rubber/metal bond

| Test and Test specimens | Binder Invention | | | | | Comparison | | | |
|---|---|---|---|---|---|---|---|---|---|
| | I | II | III | IIIa | IV | V | VI | VII | VIII |
| After peel test | | | | | | | | | |
| a) HC 101 (NR)[1]) | 100 R | 100 R | 100 R | 100 R | 100 R | 100 R | 80 R/RC | 100 R | 5 R/RC |
| b) HC 202 A (SBR)[2]) | — | — | — | — | 100 R | — | — | 100 R | 100 R |
| c) 40 468 (EPDM)[3]) | 100 R | 100 R | 100 R | 100 R | — | 100 R | 50 R/RC | — | — |
| d) 40 467 (EPDM)[4]) | 100 R | 100 R | 100 R | 100 R | — | 100 R | 40 R/RC | — | — |
| After boiling water test | | | | | | | | | |
| a) HC 101 (NR)[1]) | 100 R | 100 R | 100 R | 100 R | 100 R | 100 R | 50 R/RC | 100 R | OR |
| c) 40 468 (EPDM)[3]) | 100 R | 100 R | 100 R | 100 R | — | 100 R | 30 R/RC | — | — |
| d) 40 467 (EPDM)[4]) | 100 R | 100 R | 100 R | 100 R | — | 100 R | 20 R/RC | — | — |

[1])Natural rubber: Vulcanization for 10 minutes at 153° C.
[2])Styrene/butadiene rubber: Vulcanization for 10 minutes at 153° C.
[3])Ethylene/propylene/diene rubber: Vulcanization for 12 minutes at 160° C.
[4])See 3: Vulcanization for 10 minutes at 160° C.

TABLE 3b

Fracture pattern of the rubber/metal bond with binders XI to XV
(vulcanization temperature 153° C., 10 minutes)

| Test and test specimens | XI | XII Invention | XIV | XV Comparison |
|---|---|---|---|---|
| (1) Peel test | | | | |
| HC 101 (NR) | 100 R | 100 R | 100 R | 100 R |
| 40 468 (EPDM) | 100 R | 100 R | 80 R/RC | 80 R/RC |
| (2) Boiling water test | | | | |
| HC 101 (NR) | 100 R | 100 R | 100 R | 80 R/RC |
| 40 468 (EPDM) | 100 R | 100 R | 50 R/RC | 50 R/RC |
| (3) Preheat resistance (HC 101) | | | | |
| Time | | | | |
| 15 mins. | 100 R | 100 R | 100 R | 100 R |

TABLE 3b-continued

Fracture pattern of the rubber/metal bond with binders XI to XV
(vulcanization temperature 153° C., 10 minutes)

| Test and test specimens | XI | XII Invention | XIV | XV Comparison |
|---|---|---|---|---|
| 18 mins. | 100 R | 100 R | 100 R | 100 R |
| 21 mins. | 100 R | 100 R | 100 R | 65 R/RC |
| 24 mins. | — | 100 R | — | 60 R/RC |
| 27 mins. | — | 100 R | — | |

IV Comparison of DNB on Carbon Black with DNB Plus Carbon Black

DNB produced by method 2F using Spezialschwarz 4 (Degussa) as support material was used as reference. It was compared with DNB which had been produced by method 2F, but with no addition of support material, i.e. the DNB was subsequently mixed intensively by mechanical mixing/grinding with the quantity of support material used in 2F (Spezialschwarz 4).

Both products were incorporated in a binder of the same composition (see II) and performance-tested (see III).

The two DNB-containing formulations produced different preheat resistances although their contents of DNB and carbon black were identical. This Example sought to achieve a long preheat resistance corresponding to a fracture pattern of 100 R after a preheating time of more than 20 minutes. The manually ground DNB/carbon black binder shows adhesive failure after 15 minutes under test (65 R/RC) whereas the binder according to the invention still has a bond strength of 100 R after a preheating time of 27 minutes (see Table 3b).

We claim:

1. A composition of matter comprising p-dinitrosobenzene in a fine particulate form, supported on a support comprising a chemically inert, porous material which is solid at room temperature, said support having a BET surface greater than 1 m²/gram, wherein the supported p-dinitrosobenzene is formed from a molecularly disperse phase selected from the group consisting of vapor, solution and formation in situ, in the presence of the support.

2. The composition as claimed in claim 1 wherein said support is selected from the group consisting of hydrophilic silica, hydrophobic silica, hydrophobicized zeolites, carbon blacks, and layer silicates.

3. The composition as claimed in claim 1 wherein the content of p-dinitrosobenzene is from 30 g to 90 g per 100 g of said composition.

4. The composition as claimed in claim 1 wherein said support has a BET surface of more than 10 m$^2$/g.

5. The composition as claimed in claim 1 wherein said support is a carbon black having a BET surface of more than 20 m$^2$/g.

6. The composition as claimed in claim 1 wherein said support is a carbon black having a BET surface of more than 60 m$^2$/g.

7. The composition as claimed in claim 1 wherein composition has a mean particle size below 100 micrometers.

8. The composition as claimed in claim 1 wherein composition has a mean particle size below 40 micrometers.

9. The composition as claimed in claim 1 wherein said supported p-dinitrosobenzene has individual crystal sizes of between 0.1 micrometers and 10 micrometers.

10. The composition an claimed in claim 1 wherein said supported p-dinitrosobenzene has individual crystal sizes of between 0.3 micrometers and 3 micrometers.

11. The composition as claimed in claim 1 wherein the content of p-dinitrosobenzene is from 15 g to 90 g per 100 g of said composition.

12. The composition as claimed in claim 1 wherein the content of p-dinitrosobenzene is from 40 g to 80 g per 100 g of said composition.

13. The composition as claimed in claim 1 wherein the content of p-dinitrosobenzene is from 50 g to 75 g per 100 g of said composition.

14. A mixture comprising p-dinitrosobenzene and the composition of claim 1 wherein at least 10% by weight of the p-dinitrosobenzene in the mixture comprises the composition of claim 1.

15. A mixture comprising p-dinitrosobenzene and the composition of claim 1 wherein at least 50% by weight of the p-dinitrosobenzene in the mixture comprises the composition of claim 1.

16. A mixture comprising p-dinitrosobenzene and the composition of claim 1 wherein at least 80% by weight of the p-dinitrosobenzene in the mixture comprises the composition of claim 1.

17. A process for the production of a composition of matter comprising p-dinitrosobenzene on a support comprising a chemically inert material which is solid at room temperature, said process comprising forming solid p-dinitrosobenzene from a molecularly disperse phase of p-dinitrosobenzene selected from the group consisting of vapor, solution and formation in situ in the presence of a support comprising a chemically inert, porous material which is solid at room temperature having a BET surface area greater than 1 m$^2$/gram.

18. The process as claimed in claim 17 wherein said molecularly disperse phase is a solution comprising p-dinitrosobenzene.

19. The process as claimed in claim 18 wherein said solution is comprised of a solvent selected from the group consisting of dimethyl formamide, dimethyl acetamide, dimethyl propionamide, and N-methyl-2-pyrrolidone.

20. The process as claimed in claim 18 wherein said depositing is effected by cooling said solution while in contact with said support.

21. The process as claimed in claim 20 wherein said support is selected from the group consisting of hydrophilic silica, hydrophobic silica, hydrophobicized zeolites, carbon blacks and layer silicates.

22. The process as claimed in claim 18 wherein said depositing is effected by evaporating solvent from said solution while in contact with said support.

23. The process as claimed in claim 17 wherein said formation is effected by formation in situ by synthesis of p-dinitrosobenzene in the presence of at least one support.

24. The process as claimed in claim 23 wherein said p-dinitrosobenzene is synthesized from p-benzoquinone dioxime by treatment thereof with an oxidizing agent.

25. The process as claimed in claim 24 wherein said oxidizing agent is selected from the group consisting of ferric chloride, hydrogen peroxide with hydrochloric acid, potassium ferricyanide, sodium hypochlorite with sodium hydroxide, nitric oxide with sodium methoxide or sodium hypochlorite, and chlorine.

26. In a method for the crosslinking of elastomers wherein a crosslinking aid is mixed with the elastomer and the elastomer crosslinked, the improvement comprising: mixing with the elastomer a crosslinking aid comprising a composition of matter comprising p-dinitrosobenzene in fine particulate form supported on a support comprising a chemically inert, porous material solid at room temperature, said support having a BET surface area greater than 1 m$^2$/gram wherein the supported p-dinitrosobenzene is formed from a molecularly disperse phase selected from the group consisting of vapor, solution and formation in situ in the presence of the support.

27. The method as claimed in claim 26 wherein said elastomer is a component of an adhesive.

28. The method as claimed in claim 26 wherein said elastomer is selected from the group consisting of poly (ethylene-co-propylene-co-diene), cis-1,4-polyisoprene, poly(styrene-co-butadiene), and chlorinated rubber.

29. In a method of bonding of rubber to metal, the improvement comprising incorporating in the rubber a composition or matter comprising the composition of claim 1 to vulcanize said rubber.

30. A mixture comprising p-dinitrosobenzene and the composition of claim 1, wherein:

said chemically inert, porous material is selected from the group consisting of hydrophilic silica, hydrophobic silica, hydrophobicized zeolites, carbon blacks, and layer silicates, having a BET surface of more than 10 m$^2$/g, wherein said p-dinitrosobenzene supported on the porous support comprises individual crystals between 0.1 micrometers and 10 micrometers, and at least 50% by weight of the p-dinitrosobenzene in the mixture comprises p-dinitrosobenzene deposited on the support.

* * * * *